United States Patent

[11] 3,630,842

[72] Inventors Jiro Ishiyama
Noda-shi;
Tamotsu Yokotsuka; Nobuo Saito, both of
Nagareyama-shi, all of Japan
[21] Appl. No. 824,265
[22] Filed May 13, 1969
[45] Patented Dec. 28, 1971
[73] Assignee Kikkoman Shoyu Co., Ltd.
Noda-shi, Japan
[32] Priority Aug. 9, 1968
[33] Japan
[31] 43/56138, Aug. 10, 1968, Japan, 43/72863

[54] PRODUCTION OF 3',5'-CYCLIC ADENYLIC ACID WITH MICRO-ORGANISMS
8 Claims, No Drawings
[52] U.S. Cl. .................................................. 195/28 N
[51] Int. Cl. ............................................... C12d 13/06
[50] Field of Search ....................................... 195/28 N

[56] References Cited
OTHER REFERENCES

Journal of Biological Chemistry, Vol. 237, No. 4, pages 1228–1232 (April 1962).

Primary Examiner—Alvin E. Tanenholtz
Attorney—Cushman, Darby & Cushman

ABSTRACT: A better and more practical fermentation method was sought out to produce a biochemically valuable compound, 3',5'-cyclic adenylic acid, from adenosine, adenine, inosine, hypoxanthine, 5-amino-4-imidazolecarboxamide-riboside, 5-amino-4-imidazolecarboxamide, succinyl adenosine, and succinyl adenine, by cultivating aerobically under suitable conditions a strain of micro-organisms belonging to one of Corynebacterium murisepticum No. 7 (ATCC 21374), a new species of Arthrobacter, No. 11 (ATCC 21375) and a new species of Microbacterium, No. 205° (ATCC 21376), and being capable of producing said acid from the above-named compounds, in a medium which contains, other than at least one of said compounds, suitable carbon sources, nitrogen sources and other inorganic substances. Then, 3',5'-cyclic adenylic acid thus formed and accumulated in said medium was further purified by means of charcoal and appropriate ion exchange resins and the like.

PRODUCTION OF 3',5'-CYCLIC ADENYLIC ACID WITH MICRO-ORGANISMS

This invention relates to a microbial fermentation to produce 3',5'-cyclic adenylic acid, and more particularly to produce 3',5'-cyclic adenylic acid by cultivating micro-organisms which are classified as genera *Corynebacterium*, *Arthrobacter*, and Microbacterium and have ability to produce said acid from adenosine, adenine, inosine, hypoxanthine, 5-amino-4-imidazolecarboxamide, 5-amino-4-imidazolecarboxamide-riboside, succinyl adenosine and succinyl adenine, in a medium containing at least one of said compounds as well as usual nutrient materials.

3',5'-cyclic adenylic acid is well-known for its participation in various chemical reactions in living cells and for its active role as a mediator to various hormones. It has therefore always been a highly evaluated biochemical reagent. The production of said acid still has to go through many complicated steps by chemical synthesis, and not yet taken over by any simpler method producing said acid more easily and in a commercially satisfactory amount. Consequently, the inventors of this invention contemplating on a simpler and more economical method have conceived the utilization of specific micro-organisms. Standing on their ground, the inventors have undertaken to collect and select suitable micro-organisms from natural sources, which would fulfill the object of this invention. Then, it was discovered that strains of micro-organisms belonging to *Corynebacterium murisepticum*, No. 7, a new species of *Arthrobacter*, No. 11, and a new species of *Microbacterium*, No. 205, can produce 3',5'-cyclic adenylic acid by cultivation; and based on such findings, the purpose of this invention has been achieved. *Corynebacterium murisepticum* No. 7 (ATCC 21374); Arthrobacter No. 11 (ATCC 21375) and Microbacterium No. 205 (ATCC 21376) deposited in the American-Type Culture Collection will be made freely available upon the issuance of a patent from this application and the cultures will be maintained in the public depository for the life of the patent.

The mycological characteristics of the above-named strains are further discussed in details as follows:

1. Morphological characters (cultivated in nutrient agar stroke and nutrient broth at 37° and 30° C. respectively)

*Microbacterium* No. 205 (ATCC 21376)
Form and arrangement: club-shaped or curved cells were observed within a visual field of microscope; and occasionally angular and palisadelike arrangements resulted from snapping division were observed.
Size of cell (age: 16 hr, 30° C): 0.4–0.7×1.5–3 micron
Gram staining ×
Spore staining (sporulation) −
Flagella −
Motility −

*Corynebacterium murisepticum* No. 7 (ATCC 21374)
Form and arrangement: rods, at first elongated cells, branched cells and V-shaped cells were observed; and after 2 or 3 days, cultures show coccoid form.
Size of cell (age: 16 hr): 0.5–0.8×1.5–4 micron
Gram staining +
Spore staining (sporulation) −
Flagella −
Motility −
Acid-fast staining −

*Arthrobacter* No. 11 (ATCC 21375)
Form and arrangement: rods, at first elongated cells, branched cells, V-shaped cells were observed. After 3 or 4 days, cultures show coccoid.
Size of cell (age: 16 hr): 0.5–0.8×2–5 micron
Gram staining variable
Spore staining (sporulation) −
Flagella −
Motility −
Acid-fast staining −

II. Cultural characters:

1. Agar slant: (bouillon agar slant, at 30° C. 48 hr.)

|  | No. 205 | No. 7 | No. 11 |
|---|---|---|---|
| Growth: | moderate | moderate | moderate |
| Form: | echimulate glistening | filiform glistening | filiform glistening |
| Luster: | and moist | and moist | and moist |
| Color: | yellow | milk-white | milk-white |
| Consistency: | butyrous | butyrous | butyrous |

2. Agar colonies: (bouillon agar, at 30° C. for 48 hr.)

|  | No. 205 | No. 7 | No. 11 |
|---|---|---|---|
| Form: | circular | circular | circular |
| Surface: | smooth | smooth | smooth |
| Edge: | entire | entire | entire |
| Elevation: | convex | pulvinate | pulvinate |
| Optical character: | opaque | opaque | opaque |

3. Nutrient broth: (bouillon broth, at 30° C., age 7 days)

|  | No. 205° | No. 7 | No. 11 |
|---|---|---|---|
| Surface growth: | ring | ring | ring |
| Clouding: | moderately turbid | slightly turbid | slightly turbid |
| Amount of growth: | moderate | moderate | moderate |
| Sediment | scanty, viscid | viscid | viscid |

4. Potato agar slant: (at 30° C., age 3 days)

|  | No. 205 | No. 7 | No. 11 |
|---|---|---|---|
| Growth: | moderate | moderate | no growth |
| Color: | yellow | milk-white | − |

5. Optimal temperature for growth:

| No. 205 | No. 7 | No. 11 |
|---|---|---|
| 37° C. | 37° C. | 37° C. |

6. Thermal resistance on heating in 10 percent skim milk, at 72° C. for 15 min. and 70° C. for 30 min.:

| No. 205 | No. 7 | No. 11 |
|---|---|---|
| + | − | − |

III. Physiological characters:

|  | No. 205 | No. 7 | No. 11 |
|---|---|---|---|
| 1. Catalase reaction: (30° C. bouillon slant) | + | + | + |
| 2. Reduction of nitrate: (cultured at 30° C.) | + | + | + |
| 3. Production of indole: (at 30° C., age 5 days) | − | − | − |
| 4. Production of hydrogen sulfide: (at 30° C., age 5 days) | − | − | − |
| 5. Utilization of citrate: | + | + | − |
| 6. Voges-proskauer reaction: (at 30° C., age 5 days) | − | − | − |
| 7. Methyl red test: | − | − | − |
| 8. Liquefaction of gelatin (at 30° C., age 5 days) | + | + | + |
| 9. Decomposition of cellulose: | − | − | − |
| 10. Reaction of urease: | − | − | − |
| 11. Reduction of methylene blue: | + | + | − |
| 12. Action on litmus milk: | reduce, acidify, peptonize yellow | reduce, basify, peptonize | reduce, basify, peptonize |
| 13. Pigment production: | pigment | − | − |
| 14. Pathogenecity: | − | − | − |
| 15. Liquefection of starch: | + | + | + |

16. Utilization of sugars:

|  | No. 205 | | No. 7 | | No. 11 | |
|---|---|---|---|---|---|---|
|  | Acid prod. | Gas prod. | Acid prod. | Gas prod. | Acid prod. | Gas prod. |
| Glucose | + | − | + | − | − | − |

|  | No. 205 | | No. 7 | | No. 11 | |
|---|---|---|---|---|---|---|
| Glycerine | + | − | + | − | − | − |
| Xylose | + | − | + | − | − | − |
| Saccharose | + | − | + | − | + | − |
| Starch | − | − | − | − | − | − |
| Fructose | + | − | + | − | + | − |
| Galactose | + | − | + | − | − | − |
| Mannose | + | − | + | − | − | − |
| Arabinose | + | − | − | − | − | − |
| Maltose | − | − | − | − | − | − |
| Trehalose | − | − | − | − | − | − |
| Raffinose | + | − | + | − | − | − |
| Mannit | + | − | + | − | − | − |
| Dextrin | + | − | − | − | − | − |
| Inulin | ± | − | + | − | − | − |
| Lactose | + | − | ± | − | − | − |
| 17. Utilization of nitrates: | + | | + | | + | |
| 18. Utilization of ammonium salts: | + | | + | | + | |

In reference to the Bergey's *Manual of Determinative Bacteriology*, 7th edition, the above-described strains are pleomorphic, positive to catalase, Gram-positive, aerobic and nonspore forming, and thereby belong to Order *Eubacteriales*. Further discussing on respective strains, the strain No. 205 shows the heat resistance in 10 percent skim milk up to the temperature of 72° C. for 15 minutes and at 70° C. for 30 minutes, by which it is differentiated from any of genera *Listeria*, *Erysipelothrix*, *Cellulomonas*, *Arthrobacter* and *Corynebacterium*, under family *Corynebacteriaceae*, but it properly classified into genus *Microbacterium* of said family. However, going on to further classification, this strain does not come under any species of said genus in said Manual and other species heretofore known. Therefore, it is decided to give another new species to this strain.

The strain No. 11 should belong to genus *Arthrobacter*, for its Gram strain is variable. Organisms belonging to said genus are largely divided into two groups according to their ability of utilizing nitrates, ammoniac nitrogen and citrates; however, this strain utilizes nitrates and ammoniac nitrogens but not citrates and therefore falls into neither of the above-said groups. Thus, the strain is determined to be a new species of genus *Arthrobacter*.

The strain No. 7 is positive to catalase, nonmotile, incapable of utilizing cellulose, Gram positive and has no heat resistance in 10 percent skim milk; thereby it comes under genus *Corynebacterium*. Furthermore, the strain is nonmotile, forms nitrite from nitrate, and produces acid from glucose, lactose, sucrose and mannit. Therefore, it properly categorized into *Corynebacterium murisepticum*.

Other strains of micro-organisms than above described, which can produce 3′,5′-cyclic adenylic acid from adenosine, adenine, inosine, hypoxanthine, 5-amino-4-imidazolecarboxamide-riboside, 5-amino-4-imidazolecarboxamide, succinyl adenosine or succinyl adenine, are eligible for use in this invention.

In producing 3′,5′-cyclic adenylic acid according to the present invention, one or more of adenosine, adenine, inosine, hypoxanthine, 5-amino-4-imidazolecarboxamide-riboside, 5-amino-4-imidazolecarboxamide, succinyl adenosine and succinyl adenine, solid or liquid material containing one or more of the above compounds, or fermented mash of the above compounds is added to a medium containing carbon sources, nitrogen sources and inorganic phosphate, which can be utilized by said strains, and if necessary, other inorganic salts and ingredients. A micro-organism is cultured in the medium at pH 5 to 9, at 20° to 40° C. until the maximum yield of 3′,5′-cyclic adenylic acid is obtained, e.g., for 10 to 80 hours. Alternatively, a strain of micro-organisms as used in this invention is first inoculated in said medium and is cultivated in said medium at pH 5 to 9, at 20° to 40° C. for an appropriate period of time, e.g., 10 to 40 hours. After cultivation, one or more of adenosine, adenine, inosine, hypoxanthine, 5-amino-4-imidazolecarboxamide-riboside, 5-amino-4-imidazolecarboxamide, succinyl adenosine and succinyl adenine is added into the cultured broth in an amount of 0.1 to 3.0 percent (wt./vol.) to the total volume of the medium. And, further cultivation is carried out at in the medium gives the maximum amount, e.g., for 10 to 80 hours.

The above-said medium contains such saccharine materials as glucose starch hydrolysate, glycerine and so forth as carbon source; ammonium sulfate, ammonium chloride, urea, various amino acids, hydrolysate of protein or peptide, and extracts of living cells, e.g., corn steep liquor and yeast extract, for nitrogen sources; potassium dihydrogen phosphate or sodium dihydrogen phosphate, dipotassium hydrogen phosphate or disodium hydrogen phosphate, ammonium phosphate, and so forth, for the source of inorganic phosphate; and other inorganic salts than the above named to be added if required, for instance, magnesium sulfate, magnesium chloride, ferric sulfate or ferrous sulfate, ferric chloride or ferrous chloride, zinc sulfate or zinc chloride, cobalt sulfate or cobalt chloride, and the like. The cultivation is carried out by any suitable method, e.g., with shaking, with agitation, aerobically and so on.

When the formation of 3′,5′-cyclic adenylic acid in the medium attains its maximum, the cultivation is terminated, and said acid is isolated from the fermented broth and purified. In the isolation and purification of said acid, active charcoal, anionic exchange resin, 3′,5′-cyclic adenylic acid insoluble solvent, and so on are applied in combination. For an example, the fermented broth with cell bodies removed is treated with active charcoal as to absorb 3′,5′-cyclic adenylic acid in the broth, which is washed with ammoniac alcohol solution or ammoniac acetone solution to elute said acid therefrom. The eluate obtained is vacuum-concentrated to remove an excessive ammonia and ethyl alcohol and further treated with anionic ion exchange resin such as Dowex I (chloride form) and Dowex I (formate form) and washed with an appropriate solvent (for example, with dilute hydrochloric acid or calcium chloride plus dilute hydrochloric acid type for Dowex I (chloride form) and with dilute formic acid or with dilute formic acid plus sodium formate type for Dowex I (formate form) to elute said acid. The eluate is again absorbed on charcoal, washed with ammoniac alcohol solution or ammoniac acetone solution, vacuum-concentrated to remove an excessive ammonia and ethyl alcohol and so on, absorbed on cationic exchange resin (e.g., Dowex 50 ($H^+$)) and finally eluted with dilute hydrochloric acid. Thus, either by vacuum-concentrating the obtained eluate and leaving in a cool room or by adding such solvent as alcohol, acetone or the like which do not dissolve 3′,5′-cyclic adenylic acid, said acid is obtained in crystal form.

For another method, 3′,5′-cyclic adenylic acid formed in the cultured broth is absorbed on charcoal after cell bodies are removed from the broth and eluted with ammoniac alcohol solution or ammoniac acetone solution. The eluate, after excessive ammonia and ethyl alcohol are removed by vacuum concentration or other methods, is acidified with hydrochloric acid and added with organic solvent such as alcohol and acetone to obtain said acid in crude form. Such obtained crude acid can be purified by means of anionic ion exchange resin or cationic ion exchange resin treatment as mentioned above. The above-obtained crude acid is dissolved in water, acidified with hydrochloric acid or with phosphoric acid, decolorized with decolorizing exchange resin (e.g., Duolite S—30) and added with alcohol, acetone or other solvents not dissolving said acid, to obtain said acid in crystal form.

And for still another method of separation and purification, the cultured broth with cell bodies removed is directly treated with anionic ion exchange resin or cationic ion exchange resin to absorb 3′,5′-cyclic adenylic acid therein, and after a treatment of the resulting eluate with active charcoal or decolorizing resin, 3′,5′-cyclic adenylic acid in crystal form is obtained by adding solvent insoluble of said acid.

The product as produced according to this invention was determined to coincide in value with the authentic sample of 3′,5′-cyclic adenylic acid, by means of elementary analysis, assays of ribose and phosphor, and ultraviolet absorption spectrum and infrated absorption spectrum.

As above described, the method in this invention is a very efficient one to produce 3',5'-cyclic adenylic acid in a single step for a short period of time from adenosine, adenine, inosine, hypoxanthine, 5-amino-4-imidazolecarboxamide-riboside, 5-amino-4-imidazolecarboxamide, succinyl adenosine or succinyl adenine, which so far could not be produced in any way but by synthesis requiring many complicated steps.

Following examples are used for the purpose of illustration only and do not limit the invention therein.

Example 1

Strain No. 205 (ATCC 21376) as classified in genus *Microbacterium* was inoculated and cultivated on a slant culture medium having the composition of ammonium sulfate (0.5 percent), potassium dihydrogen phosphate (0.5 percent), magnesium sulfate (0.5 percent), casamino acid (1.0 percent), yeast extract (0.3 percent), glucose 1.0 percent), agar-agar (2.0 percent) and pH: 7.0 (adjusted with 3N potassium hydroxide solutions).

Separately, 40 ml. each of a medium consisting of zinc sulfate (0.01 percent), glucose (5.0 percent), urea (0.5 percent), ammonium sulfate (0.5 percent), potassium dihydrogen phosphate (1.0 percent), dipotassium hydrogen phosphate (1.0 percent), polypeptone (1.0 percent), corn steep liquor (0.1 ml/l.), inosine (0.3 percent), and magnesium sulfate (1.0 percent) and of pH 8.0 (adjusted with 3N potassium hydroxide solution) was poured into a 500-ml. flask for shaking culture. After autoclaved at 115° C. for 12 minutes, the above-prepared seed culture was inoculated in said fermentation medium and cultivated on shaker at 30° C. for 32 hours. As a result, 3.1 mg./ml. of 3',5'-cyclic adenylate were accumulated in the medium.

The cultured broth as above obtained was centrifuged to remove the cells and the supernatant adjusted to pH 2.0 with concentrated hydrochloric acid was treated with active charcoal to absorb 3',5'-cyclic adenylic acid therein. Said acid as absorbed on charcoal was eluted with 1.4 percent ammonia-containing ethyl alcohol, and the eluate was further concentrated by vacuum concentration to sort out ammonia and ethyl alcohol. Then, the culture filtrate thereby obtained was chromatographed at pH 8.0 on Dowex-1 (× 4) formate (100–200 mesh). As it is further eluted with a mixture of 0.1M formic acid and 0.1M sodium formate, a 3',5'-cyclic adenylic acid fraction was obtained.

The above-obtained fraction was again absorbed on charcoal; such charcoal was washed with water and eluted with 1.4 percent ammonia-containing ethyl alcohol according to the above-described method; and the eluate was concentrated by vacuum concentration. The residued fraction was adjusted to pH 2.0 with dilute hydrochloric acid and chromatographed on Dowex-50 (× 4)H$^+$(100–200 mesh). As it was further eluted with 0.1N hydrochloric acid, a 3',5'-cyclic adenylic acid fraction was obtained. After said fraction was concentrated by vacuum concentration and the residue left in a cool room at 2° or 3° C., 920 mg. of crystalline 3',5'-cyclic adenylic acid was obtained out of 50 ml. of cultured broth.

Example 2

*Corynebacterium murisepticum* No. 7 (ATCC 21374) was inoculated and cultivated on a slant culture medium having the composition of ammonium sulfate (0.5 percent), potassium dihydrogen phosphate (0.5 percent), magnesium sulfate (0.005 percent), casamino acid (1.0 percent), yeast extract (0.3 percent), glucose (1.0 percent), agar-agar (2.0 percent) and pH:7.0 (adjusted with 3N potassium hydroxide solutions).

Separately, 30 ml. each of a medium consisting of glucose (5.0 percent), ammonium chloride (0.5 percent), dipotassium hydrogen phosphate (1.0 percent), potassium dihydrogen phosphate (1.0 percent), polypeptone (1.0 percent), yeast extract (0.5 percent), zinc sulfate (0.0027 percent and the pH adjusted to 8.0 (with 3N potassium hydroxide solution) was poured into a 500-ml. flask for shaking culture. After autoclaving such medium at 115° C. for 10 minutes and adding 3 percent calcium carbonate thereto which was sterilized separately, the above-prepared seed culture was inoculated in said fermentation medium and cultivated on shaker at 30° C. for 10 hours. Then, with inosine (60 mg. added, the cultivation is continued at the same temperature for 70 hours, with shaking, whereby 21 mg./ml. of 3',5'-cyclic adenylic acid was formed therein.

The cultured broth as above-obtained was centrifuged to remove the cells and the supernatant adjusted to pH 4.0 with 3N hydrochloric acid was treated with active charcoal to absorb 3',5'-cyclic adenylic acid therein. Said acid as above absorbed on charcoal was eluted with 1.4 percent ammonia containing ethyl alcohol; and the eluate was chromatographed on Amberlite IRC—50(H$^+$) to remove an excessive ammonia, and thereafter concentrated by vacuum concentration. By adding alcohol to the residue, 830 mg. of crystalline 3',5'-cyclic adenylic acid was obtained out of 500 ml. of cultured broth.

Example 3

Strain No. 205 (ATCC 21376) belonging to genus *Microbacterium* was inoculated and cultivated on a slant culture medium having the composition of ammonium sulfate (0.5 percent), potassium dihydrogen phosphate (0.5 percent), magnesium sulfate (0.05 percent), casamino acid (1.01 percent), yeast extract (0.3 percent), glucose (1.0 percent), agar-agar (2.0 percent), and pH adjusted to 7.0 (with 3N potassium hydroxide solution).

Separately, 40 ml. each of a medium composed of glycerine (4.0 percent), ammonium sulfate (0.5 percent), potassium dihydrogen phosphate (0.5 percent), urea (0.5 percent), dipotassium hydrogen phosphate (0.5 percent), polypeptone (1.0 percent), magnesium sulfate (1.0 percent), yeast extract (0.5 percent), hypoxanthine (0.2 percent), zinc sulfate (0.0027 percent), and pH 7.0 (adjusted with 3N potassium hydroxide solution) was poured into a 500-ml. flask for shaking culture. After autoclaving such medium at 115° C. for 10 minutes and adding 3 percent calcium carbonate thereto which was sterilized separately, the above-prepared seed culture was inoculated by suspension and cultivated on shaker at 30° C. for 30 hours, whereby 1.5 mg./ml. of 3',5'-cyclic adenylic acid was formed.

The above-obtained cultured broth was centrifuged to remove the cells and treated in the same manner as described in example 1. As a result, 350 mg. of 3',5'-cyclic adenylic acid was obtained from 500 ml. of cultured broth.

Example 4

Strain No. 11 (ATCC 21375) of genus *Arthrobacter* was precultured on a slant culture medium having the same composition as in example 2, at 30° C. for 24 hours. The obtained seed culture was inoculated in 40 ml. each of fermentation medium in a 500-ml. flask for shaking culture, composed of glucose (5.0 percent), ammonium sulfate (0.5 percent), dipotassium hydrogen phosphate (1.0 percent), urea (0.5 percent), potassium dihydrogen phosphate (1.0 percent), polypeptone (1.0 percent, magnesium sulfate (1.0 percent), yeast extract (0.5 percent), 5-amino-4-imidazolecarboxamide-riboside (0.2 percent), cobalt sulfate (0.001) and pH 7.0 (adjusted with 3N potassium hydroxide solution), which has been autoclaved at 115° C. for 12 min. and added with 3 percent calcium carbonate separately sterilized; and it was cultivated at 30° C. for 40 hours with shaking to obtain 1.8 mg./ml. of 3',5'-cyclic adenylic acid.

The obtained cultured broth was centrifuged to remove the cells and treated in such manner as described in example 1. As a result, 415 mg. of 3',5'-cyclic adenylic acid was obtained out of 500 ml. of the cultured broth.

Example 5

Strain No. 11 (ATCC 21375) of genus *Arthrobacter* was precultured on a slant culture medium having the same composition as in example 2, at 30° C. for 24 hours. The obtained seed culture was inoculated and cultivated at 30° C. for 72 hours with shaking in 40 ml. each of fermentation culture medium in a 500-ml. flask for shaking culture, composed of glucose (5.0 percent), ammonium sulfate (0.5 percent), dipotassium hydrogen phosphate (1.0 percent), urea (0.5 percent), potassium dihydrogen phosphate (1.0 percent), polypeptone (1.0 percent), magnesium sulfate (0.5 percent), yeast extract (0.5 percent), 5-amino-4-imidazolecarboxamide (0.2 percent), cobalt sulfate (0.001 percent), and pH 7.0 (adjusted with 3N potassium hydroxide solution), which had been autoclaved. Thus, 1.4 mg./ml. of 3',5'-cyclic adenylic acid was formed in said medium. After treating the cultured broth in the same manner as described in example 1, 332 mg. of 3',5'-cyclic adenylic acid was obtained from 500 ml. of the cultured broth.

Example 6

Corynebacterium murisepticum No. 7 (ATCC 21374) having been prepared in a seed culture medium in the same manner as in example 5 was inoculated in a fermentation culture medium which have the same composition as in example 4 with an exception that 0.2 percent succinyl adenosine was added in place of 5-amino-4-imidazolecarboxamide. It was cultivated with shaking at 30° C. for 40 hours, and 1.2 mg./ml. of 3',5'-cyclic adenylic acid was produced. Such cultured broth was centrifuged to remove the cells, and treated according to example 1 to obtain 180 mg. of said acid from 500 ml. of cultured broth.

Example 7

Strain No. 205 (ATCC 21376) of genus Microbacterium having been prepared with the same seed culture method as in example 4 was inoculated in a fermentation culture medium having the same composition as in example 5 with an exception that 0.2 percent succinyl adenine was added instead of 5-amino-4-imidazolecarboxamide. After being cultivated with shaking at 30° C. for 70 hours, 0.7 mg./ml. of 3',5'-cyclic adenylic acid was produced. The cultured broth was centrifuged to remove the cells and treated as in example 1 to obtain 121 mg. of said acid from 500 ml. of the cultured broth.

Example 8

Strain No. 205 (ATCC 21376) of genus Microbacterium having cultivated in the seed culture medium as in example 5 was inoculated in a fermentation medium with the same ingredients as in example 6 except 0.2 percent adenosine added in place of 5-amino-4-imidazolecarboxamide, and cultivated at 30° C. for 40 hours with shaking to have the yield of 2.0 mg./ml. of 3',5'-cyclic adenylic acid. The cultured broth was centrifuged to remove the cells and, according to example 2, it was treated to obtain 750 mg. of said acid out of 500 ml. of the broth.

Example 9

Strain No. 205 (ATCC 21376) belonging to genus Microbacterium having been cultured in the seed culture medium as in example 4 was inoculated in a fermentation culture medium with the same composition as in example 5 except that 0.1 percent adenine was added in place of 5-amino-4-imidazolecarboxamide, and cultivated with shaking at 30° C. for 70 hours to get the yield of 1.2 mg./ml. of 3',5'-cyclic adenylic acid. The cultured broth was centrifuged to remove the cells and, in the same manner as in example 1, it was treated to obtain 230 mg. of said acid out of 500 ml. of the cultured broth.

What is claimed is:

1. A process for producing 3',5'-cyclic adenylic acid which comprises culturing under aerobic conditions a strain of micro-organism capable of producing 3',5'-cyclic adenylic acid from adenosine, adenine, inosine, hypoxanthine, 5-amino-4-imidazole-carboxamide-riboside, 5-amino-4-imidazolecarboxamide, succinyl adenosine or succinyl adenine and belonging to a species selected from the group consisting of Corynebacterium murisepticum, Arthobacter No. 11 (ATCC 21375) and Microbacterium No. 205 (ATCC 21376) in a medium containing carbon and nitrogen sources, inorganic nutrient substances and at least one member selected from the group consisting of adenosine, adenine, inosine, hypoxanthine, 5-amino-4-imidazolecarboxamide-riboside, 5-amino-4-imidazolecarboxamide, succinyl adenosine and succinyl adenine at pH 5–9 at a temperature of 20°–40 C. until 3',5'-cyclic adenylic acid is accumulated in the medium, and recovering 3',5'-cyclic adenylic acid from the medium.

2. A process according to claim 10, wherein the micro-organism is Corynebacterium murisepticum No. 7, ATCC 21374, Arthrobacter No. 11, ATCC 21375 or Microbacterium No. 205, ATCC 21376.

3. A process according to claim 1, wherein culturing is conducted with shaking, agitation or aeration.

4. A process according to claim 1, wherein culturing is carried out for 10–80 hours.

5. A process according to claim 1, wherein the medium contains 0.1–3.0 percent by weight per volume of at least one member selected from the group consisting of adenosine, adenine, inosine, hypoxanthine, 5-amino-4-imidazolecarboxamide-riboside, 5-amino-4-imidazolecarboxamide, succinyl adenosine and succinyl adenine, based on the total volume of the medium.

6. A process according to claim 1, wherein the micro-organism is grown initially in a medium containing said at least one member.

7. A process according to claim 1, wherein the micro-organism is precultured in a medium containing carbon and nitrogen sources and inorganic nutrient substances at pH 5–9 at a temperature of 20°–40° C. and then at least one member selected from the group consisting of adenosine, adenine, inosine, hypoxanthine, 5-amino-4-imidazolecarboxamide-riboside, 5-amino-4-imidazolecarboxamide, succinyl adenosine and succinyl adenine is added to the precultured medium and culturing is further continued at pH 5–9 at a temperature of 20°–40° C.

8. A process according to claim 1, wherein the recovering is conducted by treating the medium in which the 3',5'-cyclic adenylic acid is accumulated with charcoal, anionic ion exchange resin, cationic ion exchange resin, decolorizing resin, vacuum concentration or a solvent which do not resolve the desired 3',5'-cyclic adenylic acid.

* * * * *

UNITED STATES PATENT OFFICE
CERTIFICATE OF CORRECTION

Patent No. 3,630,842　　　　　Dated December 28, 1971

Inventor(s) Jiro ISHIYAMA, Tamotsu YOKOTSUKA and Nobuo SAITO

It is certified that error appears in the above-identified patent and that said Letters Patent are hereby corrected as shown below:

Item 31, "Aug. 10, 1968" should be changed to --Oct. 8, 1968--.

Signed and sealed this 25th day of July 1972.

(SEAL)
Attest:

EDWARD M. FLETCHER, JR.　　　　ROBERT GOTTSCHALK
Attesting Officer　　　　　　　　Commissioner of Patents